United States Patent
Klein

[11] Patent Number: 5,941,989
[45] Date of Patent: Aug. 24, 1999

[54] APPARATUS FOR INDICATING POWER-CONSUMPTION STATUS IN A COMPUTER SYSTEM

[75] Inventor: Dean A. Klein, Eagle, Id.

[73] Assignee: Micron Electronics, Inc., Nampa, Id.

[21] Appl. No.: 08/779,578

[22] Filed: Jan. 7, 1997

[51] Int. Cl.[6] ................................................. G06F 1/32
[52] U.S. Cl. .................... 713/300; 713/320; 713/321; 340/650; 340/550; 340/693
[58] Field of Search ................ 395/750.01; 455/613; 359/155; 390/870; 340/650, 550, 825.54, 693

[56] References Cited

U.S. PATENT DOCUMENTS

| | | | |
|---|---|---|---|
| 4,207,459 | 6/1980 | Nakamura et al. | 455/613 |
| 4,262,220 | 4/1981 | Delacruz | 307/311 |
| 4,780,910 | 10/1988 | Huddleston et al. | 455/617 |
| 5,049,855 | 9/1991 | Slemon et al. | 340/550 |
| 5,065,104 | 11/1991 | Kusko et al. | 324/508 |
| 5,204,536 | 4/1993 | Vardi | 250/551 |
| 5,239,495 | 8/1993 | Nanno et al. | 364/707 |
| 5,252,968 | 10/1993 | Donovan | 390/870 |
| 5,387,993 | 2/1995 | Heller et al. | 359/155 |
| 5,388,265 | 2/1995 | Volk | 395/750 |
| 5,396,635 | 3/1995 | Fung | 395/800 |
| 5,475,848 | 12/1995 | Ikeda | 395/750 |
| 5,568,607 | 10/1996 | Ishikawa et al. | 395/182.2 |
| 5,590,341 | 12/1996 | Matter | 395/750 |
| 5,630,142 | 5/1997 | Crump et al. | 395/750 |

OTHER PUBLICATIONS

PICO POWER, A Cirrus Logic Division *VESUVIUS–LS Preliminary Data Book* 384 pp, Sep. 1995.

Phoenix Technologies Ltd. *MultiKey/51L System Developer's Reference* 83 pp, Copyright 1990–1996.

*Primary Examiner*—Ayaz R. Sheikh
*Assistant Examiner*—Eric S. Thlang
*Attorney, Agent, or Firm*—Seed and Berry LLP

[57] ABSTRACT

A method and apparatus for improved indication of power-consumption status in a computer system is described. The computer system includes a light-emitting diode (LED) which produces an optical signal. The apparent intensity of the optical signal is controlled by a pulsed LED control signal having an adjustable duty cycle. By varying the duty cycle, the apparent intensity of the optical signal is varied. The rate at which the duty cycle is varied may be selected to produce an apparent intensity optical signal which varies continuously between a greatest and a least intensity. Also, the rate at which the duty cycle is varied may be selected from a plurality of rates, each corresponding with a one of a plurality of power-consumption states in which the computer system can operate.

15 Claims, 4 Drawing Sheets

APPARATUS FOR INDICATING POWER-CONSUMPTION STATUS IN A COMPUTER SYSTEM

TECHNICAL FIELD

The present invention relates generally to an apparatus for providing power-consumption status information in a computer system, and more particularly, to an apparatus for providing optical signals to a user indicating the power-consumption status of the computer system.

BACKGROUND OF THE INVENTION

The use of computers, especially personal computers (PCs) is widespread. A PC includes a number of individual components, such as a microprocessor, memory modules, various system and bus control units, and a wide variety of data input/output (I/O) devices. The components included in a PC require electrical power for operation, and a significant amount of energy is wasted when the PC is not used while maintained in a powered-up state. This is particularly disadvantageous for portable notebook computers, which rely on batteries for power. In order to provide more energy-efficient PCs, power management techniques and circuitry have been developed which place the PC into one or more powered-down states at appropriate times. For example, a PC can successively enter states or modes of progressively lower power consumption until a user interaction or other selected event occurs. Typical portable computers have states such as Full-On, Standby, Suspend, and Off.

Many portable computers include an optical status indicator with a light-emitting diode (LED) to indicate a current power-consumption status. Typically, the LED provides a constant intensity optical signal (as seen by the user) when the computer is in a Full-On state, and the LED emits no light when the computer is Off. When the computer is operating in one of the powered-down states, such as Standby or Suspend, the LED flashes off and on. The flashing LED can be aesthetically irritating to some users, and does not provide information indicating in which of the various powered-down states the computer currently operates.

SUMMARY OF THE INVENTION

The present invention is embodied in a method and apparatus for improved indication of power-consumption status in a computer system. A computer system includes a processor coupled with a system controller which operates to place the processor in a plurality of powered-down states. A system status indicator produces a plurality of system status output signals, each corresponding with a respective one of the powered-down states.

In one embodiment, the system status indicator includes an optical status indicator which produces an optical status output signal. When the system is in a powered-down state, the optical status output signal has a modulated apparent intensity and appears to gradually vary between a greatest and a least intensity. The modulation frequency may be selected to correspond with a respective one of the powered-down states, thereby providing a user with information regarding in which of the various powered-down states the computer system currently operates.

A method is provided for operating a computer system having a light-emitting diode to provide optical power-consumption status information. A duty cycle value is selected, and a pulsed electric current having the selected duty cycle is applied to the light-emitting diode. The duty cycle is then modified, and a pulsed electric current having the modified duty cycle is then applied to the light-emitting diode. In this way, the apparent intensity of the optical signal produced by the light-emitting diode is varied. The pulsed electric current having the selected duty cycle is applied for a selected time interval prior to modifying the duty cycle value. By choosing from one of a plurality of values for the selected time interval, the frequency of variation in optical signal intensity is adjusted accordingly.

DETAILED DESCRIPTION OF THE INVENTION

In the following, a novel computer system and method is described with certain specific details set forth in order to provide a sufficient understanding of various embodiments of the present invention. However, one skilled in the art will understand that the present invention may be practiced without these details. In other instances, well-known circuits, control signals, timing protocols, and software operations are not described in detail in order not to unnecessarily obscure the description of the embodiments of the invention.

Figure 1:
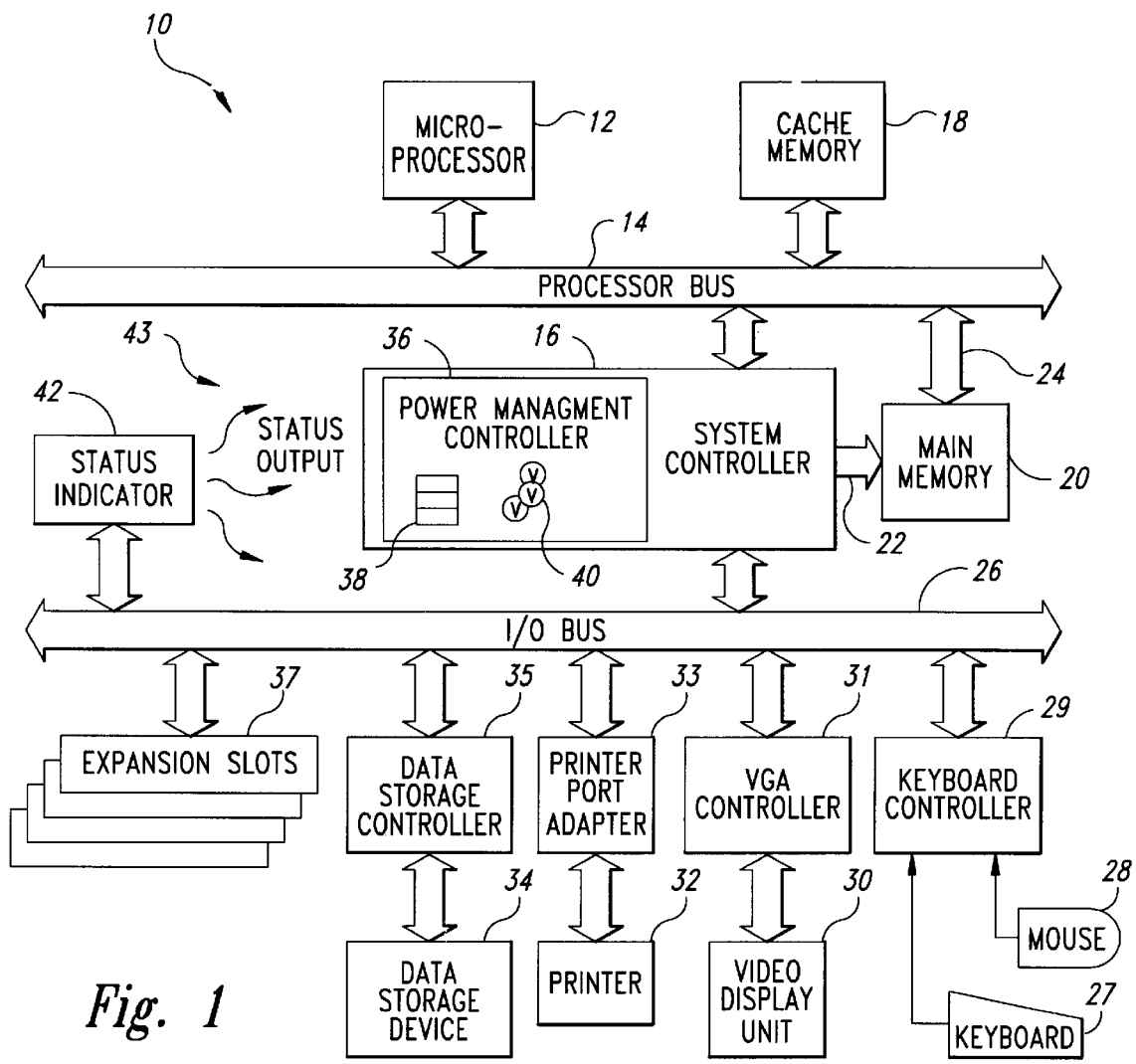
FIG. 1 is a functional block diagram of a preferred embodiment of a computer system having a power-consumption status indicator according to the present invention.

FIG. 1 shows a preferred embodiment of a computer system 10, such as an IBM-compatible PC, according to the present invention. A microprocessor 12, such as a Pentium® processor, is connected to a processor bus 14 which carries address, data, and control signals. The processor bus 14 is in turn connected to a system controller 16, such as a Picopower™ Vesuvius V1-LS controller. The processor bus 14 is also connected to a cache memory 18, such as a static random access memory (SRAM) module manufactured by Micron Technology, Inc. The system controller 16 acts as a memory controller accessing a main memory, such as a system dynamic random access memory (DRAM) 20, via a memory address and control bus 22. A data portion of the processor bus 14 is coupled with the system DRAM 20 by a memory data bus 24. The system DRAM 20 can include any of various known memory devices, such as DRAM devices manufactured by Micron Technology, Inc. Other functions included in the system controller 16, which may or may not be integrated on a single chip, include reset and clock interface circuitry, cache controller circuitry, memory data path control circuitry, system interrupt control circuitry, and general processor bus and I/O bus interface circuitry.

The system controller 16 also functions as a bridge circuit between the processor bus 14 and a system bus, such as I/O bus 26. The I/O bus 26 may itself be a combination of one or more bus systems with associated interface circuitry (e.g., PCI bus with connected SCSI and ISA bus systems). One or more data input devices are coupled with the I/O bus 26, such as a keyboard 27 and pointing device 28 with a keyboard/mouse controller 29. Also, one or more data output devices are coupled with the I/O bus 26, such as a video display unit 30 with VGA controller 31, and a printer 32 with printer port adapter 33. Additionally, one or more data storage devices 34 and associated controller(s) 35 are coupled with the I/O bus 26. Well-known examples include a floppy disk drive with DMA controller, a hard disk drive with EIDE controller, and a CD-ROM drive with SCSI controller. Further connected to the I/O bus 26 are expansion slots 37 to provide future accommodation of other I/O devices not selected during the original design of the computer system.

The system controller 16 includes a power management controller 36 having a plurality of programmable timing registers 38 associated with a plurality of system mode timers 40. The timing registers 38 are programmed during initialization of the computer system with values that control the expiration of the system mode timers 40. In response to the expiration of one of the system mode timers 40, the power management controller 36 causes the microprocessor 12 to be placed in a corresponding state or mode of lower power consumption. For example, the microprocessor 12 might be placed in a Standby mode after five minutes of system inactivity, and in a Suspend mode after 15 minutes of such inactivity. Those skilled in the art understand that even in powered-down modes, the microprocessor 12 continues to process instructions associated with low level system activity, such as timer tick events. The computer system 10 is referred to as inactive even while the microprocessor 12 processes such low level system activity.

A system status indicator 42 is coupled with the I/O bus 26 and produces status output signals 43 to a user of the computer system 10 to indicate in which of the various power-consumption states the computer system is operating. The preferred embodiment of the system status indicator 42 produces status output signals 43 which are optical signals. For example, LEDs can be employed to provide optical information to a computer user.

Figure 2:
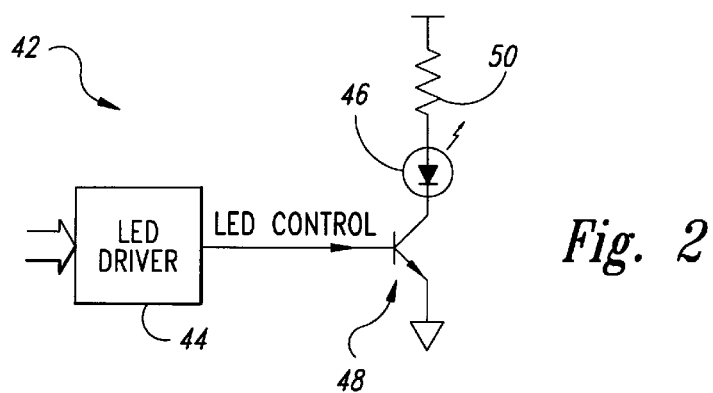
FIG. 2 is a functional block diagram of a preferred embodiment of the power-consumption status indicator of FIG. 1, and includes an LED driver circuit.

FIG. 2 shows certain details of a preferred embodiment of the system status indicator 42. The system status indicator 42 includes an LED driver circuit 44 which gates current through an LED 46 by applying an LED control signal to the control terminal of an electronically controlled switch, such as a transistor 48. To protect the LED 46, a current limiting resistor 50 is included. In accordance with the present invention, the LED control signal is modulated (as described below) to provide a variable intensity optical output signal from the LED 46. In place of the unaesthetic blinking of an LED, as in prior art systems, the apparent intensity of the LED 46 may be gradually increased and decreased to indicate operation of the computer system 10 in a powered-down state. The rate at which the apparent intensity varies can be adjusted in correspondence with the various powered-down states in which the computer system 10 operates.

Those skilled in the art will appreciate a number of advantages provided by the system status indicator 42 of the computer system 10. One advantage is an aesthetic one, in which users of the computer system 10 will view the LED 46 as having an apparent intensity which varies approximately continuously between a highest intensity and a lowest intensity. This is not as distracting to the eye as currently available computer systems in which the LED blinks or flashes. Further, most of today's PCs include a number of powered-down states which are entered after successively longer time intervals of system inactivity. The system status indicator 42 provides visual information to the user of the computer system 10, indicating in which of the various powered-down states the computer system currently operates. This contrasts with currently available computer systems in which the blinking LED signal does not distinguish between the various powered-down states. Of course, if a flashing LED is not deemed too unaesthetic, distinguishing the various powered-down states can be accomplished by correspondingly varying the flashing frequency, number, or pattern. Similarly, if distinguishing the various powered-down states is not desired, the more aesthetic gradual variation in LED intensity of a set frequency can be employed to indicate any of the powered-down states.

In the preferred embodiment of the present invention, the LED 46 receives a pulsed current corresponding to a pulsed LED control signal produced by the LED driver 44 and applied to the control terminal of the transistor 48. Although a pulsed current is applied to the LED 46, the frequency of the pulses is sufficiently high that a user viewing the LED perceives a continuous optical signal output. The pulsed LED control signal has an adjustable duty cycle (as described below) to provide the variable intensity optical output signal produced by the LED 46.

Figure 3:
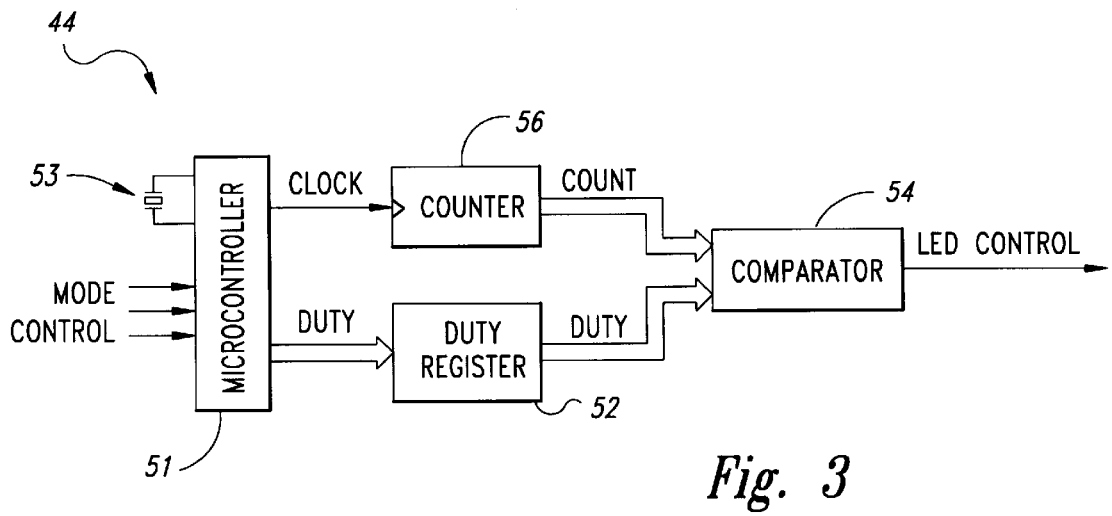
FIG. 3 is a functional block diagram of a first embodiment of the LED driver circuit of FIG. 2.

FIG. 3 depicts a first embodiment of the LED driver 44, which includes a microcontroller 51, such as a PIC microcontroller from MicroChip Technology, Inc. The microcontroller 51 has internal oscillator circuitry that generates a clock signal having a frequency determined by a crystal 53. Alternatively, the microcontroller 51 could receive a clock signal provided by (or derived from) the system clock. The microcontroller 51 also receives a plurality of MODE control signals, which are asserted by the system controller 16 of FIG. 1, either individually or in combination as desired, to correspond with the various power-consumption states in which the computer system 10 can operate. A duty register 52 stores a DUTY value provided by the microcontroller 51. The duty register 52 provides the DUTY value to a comparator 54. A counter 56, such as a ring counter, receives a clock input signal from the microcontroller 51 and produces an output COUNT value corresponding to a current count registered in the counter. The counter 56 provides the COUNT value to the comparator 54 which compares the COUNT value with the DUTY value stored in the duty register 52. The comparator 54 then produces the LED control signal, which has a high state or a low state depending upon the relative magnitudes of the COUNT and DUTY values.

In operation, when the COUNT value of the counter 56 exceeds the DUTY value provided by the duty register 52, the comparator 54 generates a low state signal. When the DUTY value is greater than or equal to the COUNT value, the comparator 54 produces a high state signal. In this way, the comparator 54 generates the pulsed LED control signal having a duty cycle corresponding to the DUTY value stored in the duty register 52. The transistor 48 functions as a switch, pulling current through the LED 46 when the LED control signal is in the high state and blocking current when the LED control signal is in the low state. By regular variation of the DUTY value stored in the duty register 52, the duty cycle of the LED control signal produced by the comparator 54 is adjusted, and the apparent intensity of the LED 46 varies accordingly.

Figure 4:
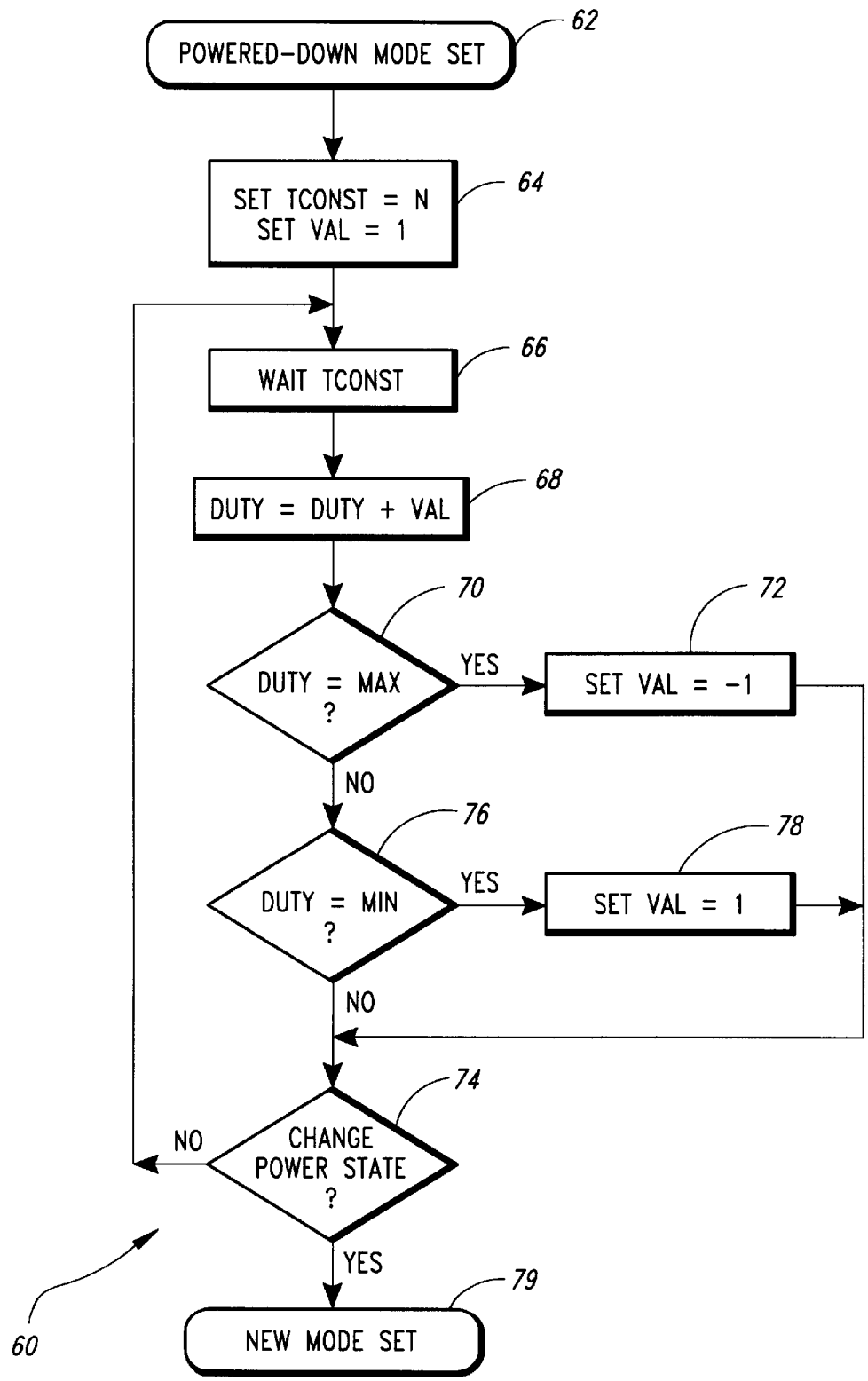
FIG. 4 is a flowchart of a software routine executed by a microcontroller included in the LED driver circuit of FIG. 3.

FIG. 4 depicts a software routine 60 which is executable by the microcontroller 51 of FIG. 3 to adjust the data values stored in the duty register 52. The software routine 60 is preferably stored in the microcontroller's read only memory (ROM). When one of the system mode timers 40 expires, the computer system 10 of FIG. 1 is placed in a corresponding powered-down state in a conventional manner. The system controller 16 asserts the MODE control signals to initiate execution of the software routine 60 in step 62. In step 64, a value TCONST is set to a value N, which is selected from a set of predetermined values stored in the microcontroller 51. The particular selected value N corresponds to the powered-down state in which the computer system 10 has been placed. Also in step 64, an incremental value VAL is set to 1. In step 66, operation of the software routine 60 is paused for a time interval corresponding to the value TCONST. In step 68, the DUTY value stored in the duty register 52 of FIG. 2 is incremented according to the incremented value VAL.

A conditional branch step 70 is executed in which the DUTY value is compared to a maximum value MAX, which is a predetermined value stored in the microcontroller 51. If the DUTY value corresponds to the MAX value, the increment value VAL is set to −1, in step 72, and the software routine 60 is routed to a conditional branch step 74. If, however, the DUTY value does not correspond to the MAX value, a conditional branch step 76 is executed in which the DUTY value is compared to a MIN value, which is also a predetermined value stored in the microcontroller 51. If the DUTY value corresponds with the MIN value, the increment value VAL is set to 1 in step 78, and the software routine 60 proceeds to the conditional branch step 74. If the DUTY value does not correspond with the MIN value, the conditional branch step 74 is executed in which it is determined whether the MODE control signals received by the microcontroller 51 indicate that the power-consumption state of system operation has changed. If not, the software routine 60 loops back to step 66 and the DUTY value is again incremented following the selected pause interval. If, however, the power-consumption state of system operation has changed, the conditional branch step 74 routes the software routine 60 to a sequence of operations 79 associated with the new power-consumption state. If the new power-consumption state is another of the powered-down states, the sequence of operations 79 is again the software routine 60 with TCONST set to a corresponding new value N.

The frequency of variation of the apparent intensity of the LED 46 is controlled by the value N to which TCONST is set. Alternatively, those skilled in the art will appreciate that the incremental value VAL can be set to various selected magnitudes greater than 1 to achieve a similar effect. However, this alternative method requires a larger capacity duty register 52, and is therefore not preferred. Those skilled in the art will also appreciate that software routine 60 may be executed by the microprocessor 12 of FIG. 1, and that the microcontroller 51 of FIG. 3 could be omitted from the computer system 10. In such an implementation, the software routine 60 is stored in a reserved system management memory portion of the system DRAM 20, and is executed by the microprocessor 12 in a system management mode, as is well-known in the art. However, this implementation is not preferred, because of the frequent system management interrupts (SMIs) required to continuously adjust the DUTY value.

Those skilled in the art will appreciate that one or more of the functions provided by the duty register 52, comparator 54, and the counter 56 of FIG. 3 can themselves be integrated within a suitable microcontroller.

Figure 5:
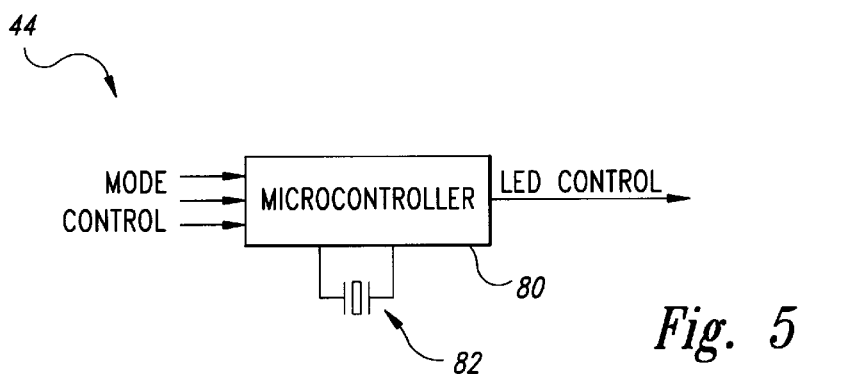
FIG. 5 is a functional block diagram of a second and preferred embodiment of the LED driver circuit of FIG. 2.

FIG. 5 depicts a second and preferred embodiment of the LED driver 44 of FIG. 2. A microcontroller 80 has internal oscillator circuitry that generates a clock signal having a frequency determined by a crystal 82. Alternatively, the microcontroller 50 could receive a clock signal provided by (or derived from) the system clock. The microcontroller 80 also receives a plurality of MODE control signals, which are asserted by the system controller 16 of FIG. 1 to correspond with the various power-consumption states in which the computer system 10 can operate. The microcontroller 80 could be any of a wide variety of suitable microcontrollers, such as an Intel® or compatible 80C51SL microcontroller. A designer of the computer system 10 could advantageously combine the operations of the microcontroller 80 and the keyboard/mouse controller 29 into a single microcontroller. Also, a number of microcontrollers include high current output drivers, which would dispense with the need for the transistor 48 of FIG. 2.

The microcontroller 80 is programmed to receive the MODE control signals and to produce the LED control signal having the characteristics described above in connection with the first embodiment of the LED driver 44. The duty cycle of the LED control signal is selected according to the MODE control signal values. For example, when the computer system operates in a Full-On state, the duty cycle of the output signal produced by the microcontroller 80 causes the LED 46 of FIG. 2 to produce a constant, high apparent intensity optical signal. When the computer system operates in a first powered-down state, the LED control signal produced by the microcontroller has a first modulated duty cycle to cause the LED 46 to produce a first variable intensity signal. When the computer system operates in a second powered-down state, the microcontroller 80 produces the LED control signal with a second modulated duty cycle which causes the LED 46 to produce a second variable optical output signal. The first and second modulation frequencies are selected according to the respective powered-down states. Those skilled in the art understand that any of a number of conventional microcontrollers can be programmed to function as described.

Figure 6:
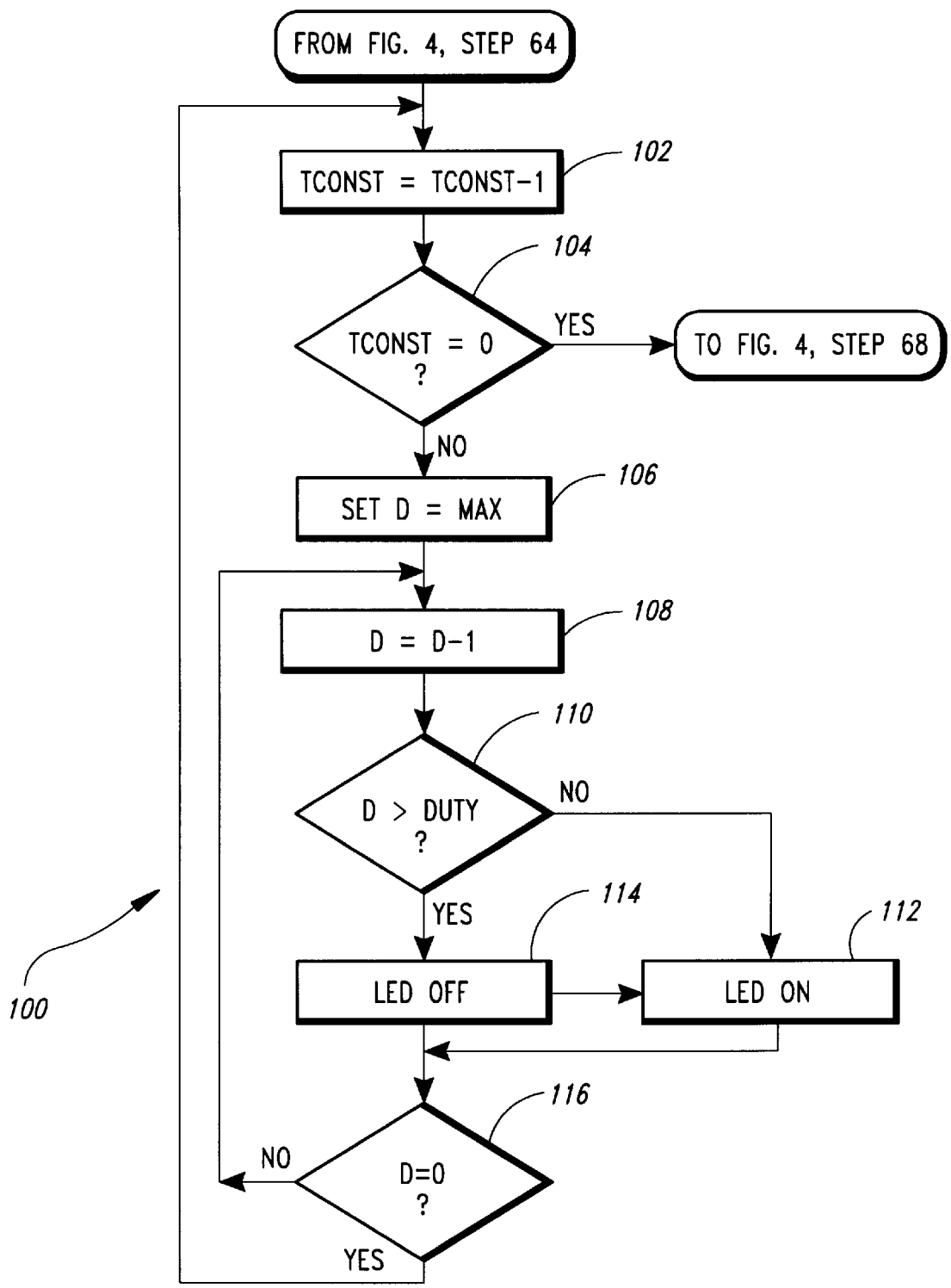
FIG. 6 is a flowchart of a software subroutine executed by a microcontroller included in the LED driver circuit of FIG. 5.

For example, the microcontroller 80 can execute a software routine which is essentially the software routine 60 depicted in FIG. 4 and described in connection with operations performed by the microcontroller 51 of FIG. 3. However, in place of step 66 of FIG. 4, the microcontroller 80 executes a software subroutine 100 which is depicted in FIG. 6. In step 102, the value TCONST is decremented. A conditional branch step 104 is executed in which the value TCONST is compared to zero. If the value TCONST is zero, the subroutine 100 is complete, and the software routine 60 of FIG. 4 is rejoined at step 68. If, however, the value TCONST is non-zero, a parameter D is set equal to the MAX duty value in step 106. The parameter D is then decremented in step 108, and the subroutine 100 is routed to a conditional branch step 110, in which the parameter D is compared to the DUTY value. If the parameter D does not exceed the DUTY value, the microcontroller 80 asserts the LED control signal to turn on the LED 46 in step 112. If, however, the parameter D exceeds the DUTY value, the microcontroller 80 deasserts the LED control signal to turn off the LED 6 in step 114. The parameter D is then compared to zero in a conditional branch step 116. If the parameter D equals zero, execution of the subroutine 100 begins again at step 102. If, however, the parameter D is non-zero, the conditional branch step 116 routes the subroutine 100 back to step 108, in which the parameter D is again decremented.

Figure 7:
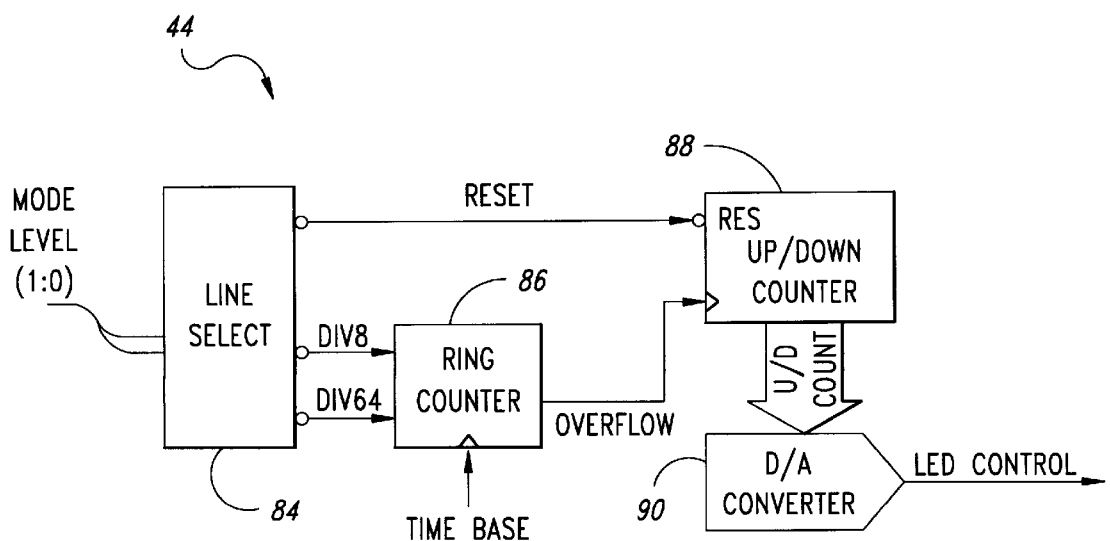
FIG. 7 is a functional block diagram of a third embodiment of the LED driver circuit of FIG. 2.

Programmable microcontrollers provide the circuit designer with a convenient and flexible means of duplicating the function of various circuits. Those skilled in the art will appreciate that a number of pure hardware circuits may be readily designed to function as the LED driver 44 described in connection with FIG. 2. FIG. 7 depicts such an embodiment. A line select circuit 84, such as an LS139 series chip, receives a multibit MODE LEVEL input from the system controller 16 of FIG. 1 and selectively asserts corresponding output line signals. A ring counter 86 receives a TIME BASE signal and cyclically counts to 8 or to 64, as determined by receipt of an asserted DIV8 or DIV64 control signal, respectively, provided by the line select circuit 84. An OVERFLOW bit of the ring counter 86 is used as the time base for an up/down counter 88, which is reset by an asserted RESET control signal provided by the line select circuit 84. Hence the up/down counter 88 receives a different time base frequency, dependent on the cycle count of the ring counter 86. The up/down counter 88 provides a U/D-COUNT value corresponding to the current count registered in the up/down counter. A digital-to-analog (D/A) converter 90 converts the digital U/D-COUNT value into a corresponding magnitude analog LED control signal to control the current flow through the LED 46 of FIG. 2. Thus, the multibit MODE LEVEL input controls the rate at which the up/down counter 88 counts, and hence the frequency of the LED control signal controlling the magnitude of the optical signal produced by the LED 46. Those skilled in the art will appreciate that any number of readily designed circuits may be functionally substituted for those shown in FIG. 7.

Each of the circuits whose function and interconnection is described above in connection with FIGS. 3, 5, and 7 are of a type known in the art, and one skilled in the art would be able to use such circuits in the described combination to practice the present invention. Also, other than the system status indicator 42 (which is described in detail in connection with FIGS. 2, 3, 5 and 7), each of the circuits whose function and interconnection is described above in connection with FIG. 1 are of a type known in the art, and one skilled in the art would be able to use such circuits in the described combination to practice the present invention. The internal details of these particular circuits are not part of, nor critical to, the invention, and a detailed description of the internal circuit operation need not be provided. Similarly, those skilled in the art will appreciate that many of the individual steps depicted in FIGS. 4 and 6 and described above are, in fact, each a sequence of operations which are well known in the art. One skilled in the art would be able to program such operations in the described sequence to practice the present invention. The various operations associated with each of the steps depicted in FIGS. 4 and 6 are not part of, nor critical to, the invention. Therefore, a detailed description of these operations is not required.

From the foregoing it will be appreciated that, although specific embodiments of the invention have been described for purposes of illustration, various modifications may be made without deviating from the spirit and scope of the invention. For example, portions of the LED driver 44 could be advantageously integrated within the system controller 16. Those skilled in the art will appreciate that numerous hardware embodiments are possible which function in a manner similar to various described embodiments of the LED driver 44. A number of well-known processor types, bus types, and system controller types could be employed according to the present invention. Additionally, variations on the sequence of operations described in connection with FIGS. 4 and 6 are contemplated within the scope of the present invention. Accordingly, the invention is not limited except as by the appended claims.

I claim:
1. A computer system, comprising:
a processor;
a processor bus coupled with the processor and operable to transfer data, address and control signals to and from the processor;
a system controller coupling the processor bus with an I/O bus and operable to transfer of data, address and control signals between the processor bus and the I/O bus, the system controller further operable to place the processor in a plurality of powered-down states; and
a system status indicator coupled with the I/O bus and operable to provide a plurality of system status signals, each corresponding with a respective one of the powered-down states, wherein the system status indicator is operable to display an optical signal having an apparent intensity which varies approximately continuously between a greatest intensity and a least intensity, wherein each of the system status signals corresponds with a respective one of a plurality of rates at which the apparent intensity varies, wherein the system status indicator includes a light-emitting diode to produce the optical signal, the light-emitting diode receiving a pulsed electric current having a variable duty cycle, and wherein the system status indicator further includes a duty register operable to store a value controlling the duty cycle, the value stored in the duty register being periodically adjusted and the duty cycle varied accordingly.

2. The computer system of claim 1 wherein the system status indicator comprises a microcontroller that contains program operation codes stored in a ROM portion of the microcontroller.

3. The computer system of claim 2 wherein the microcontroller is structured to produce a duty value to be stored in the duty register.

4. The computer system of claim 2 where the microcontroller is structured to produce a count value to be stored in a count register.

5. An optical status indicator for a computer system having a plurality of powered-down states, the optical status indicator producing a plurality of optical signals, each corresponding one-to-one with a respective one of the powered-down states, wherein each of the optical signals has an apparent intensity which varies according to a respective one of a plurality of modulation frequencies, and wherein the optical status indicator further includes a duty register operable to store a duty value, a counter operable to receive a clock signal and to produce a count value incremented in response thereto, and a comparator operable to compare the duty value with the count value and to produce a pulsed signal having first and second states corresponding to the greater of the duty and count values, respectively, the pulsed signal controlling the apparent intensity of the optical signal.

6. The optical status indicator of claim 5, further including a light-emitting diode for producing the optical signals.

7. The optical status indicator of claim 5 wherein the apparent intensity of the optical signals varies approximately continuously between a greatest intensity and a least intensity.

8. The computer system of claim 5 wherein the system status indicator comprises a microcontroller that contains program operation codes stored in a ROM portion of the microcontroller.

9. The computer system of claim 8 wherein the microcontroller is structured to produce a duty value to be stored in the duty register.

10. The computer system of claim 8 where the microcontroller is structured to produce a count value to be stored in a count register.

11. A computer system, comprising:

a processor operable in a high power state and in a low power state;

a processor bus coupled with the processor and operable to transfer data, address and control signals to and from the processor;

a system controller coupling the processor bus with an I/O bus and operable to transfer of data, address and control signals between the processor bus and the I/O bus, the system controller further operable to switch the processor between the high power state and the low power state; and an optical system status indicator coupled with the I/O bus and operable to display an optical signal having an apparent intensity which varies between a greatest intensity and a least non-zero intensity when the processor operates in the low power state wherein the optical system status indicator includes a duty register for storing a duty value, a counter for receiving a clock signal and producing a count value incremented in response thereto, and a comparator for comparing the duty value with the count value to produce a pulsed signal having first and second states corresponding to the greater of the duty and count values, respectively, the processor periodically adjusting the duty value and the apparent intensity of the optical signal varying in response thereto.

12. The computer system of claim 11 wherein the optical system status indicator includes:

a light-emitting diode operable to produce the optical signal; and a driver circuit coupled with the light-emitting diode and operable to produce a control signal to apply a variable current to the light-emitting diode.

13. The computer system of claim 12 wherein the driver circuit is coupled with the light-emitting diode by an electronically controlled switch, the driver circuit operable to apply the control signal to a control terminal of the electronically controlled switch.

14. A system status indicator for a computer system having a plurality of power-consumption states, comprising:

a light source; and a driver circuit coupled with the light source and operable to drive the light source to produce a plurality of optical signals, each corresponding with a respective one of the power-consumption states, wherein a first of the optical signals has an apparent intensity that varies approximately continuously between a greatest and a least intensity, the driver circuit including a duty register operable to store a duty value, a counter operable to produce a successively incremented count value, and a comparator operable to compare the duty value with the count value and to produce a pulsed signal having first and second states corresponding to the greater of the duty and count values, respectively, the pulsed signal controlling the apparent intensity of the first optical signal.

15. A system status indicator for a computer system having a plurality of power-consumption states, comprising:

a light source; and a driver circuit coupled with the light source and operable to drive the light source to produce a plurality of optical signals, each corresponding with a respective one of the power-consumption states, wherein a first of the optical signals has an apparent intensity that varies approximately continuously between a greatest and a least intensity, wherein the driver circuit includes a microcontroller operable to execute a program and to responsively produce a pulsed signal having a variable duty cycle, the pulsed signal controlling the apparent intensity of the first optical signal.

\* \* \* \* \*